United States Patent [19]
Onoda et al.

[11] Patent Number: 5,107,634
[45] Date of Patent: Apr. 28, 1992

[54] ACTUATOR AND SYSTEM FOR CONTROLLING VIBRATION OF STRUCTURE

[75] Inventors: Junjiro Onoda, Tokyo; Takao Endo, Iruma; Hidehiko Tamaoki, Sayama, all of Japan

[73] Assignees: Junjiro Onoda; Nissan Motor Company, Ltd., both of Japan

[21] Appl. No.: 536,920

[22] Filed: Jun. 12, 1990

[30] Foreign Application Priority Data

Jun. 13, 1989 [JP] Japan .................. 1-149799
Jun. 13, 1989 [JP] Japan .................. 1-149800
Jun. 22, 1989 [JP] Japan .................. 1-160081

[51] Int. Cl.⁵ ............................................ E04B 1/98
[52] U.S. Cl. ................................. 52/1; 52/167 DF
[58] Field of Search ................................... 52/1, 167

[56] References Cited

U.S. PATENT DOCUMENTS

| | | | |
|---|---|---|---|
| 4,799,339 | 1/1989 | Kobori et al. | 52/1 |
| 4,841,685 | 6/1989 | Masri et al. | 52/1 |
| 4,964,246 | 10/1990 | Kobori et al. | 52/1 |
| 5,005,326 | 4/1991 | Ishimaru et al. | 52/1 |

OTHER PUBLICATIONS

Document 1: "Dai 31 Kai Uchukagakugijutsukoen-kaikoenshu", 1987, pp. 400–401.
Document 2: "Dai 32 Kai Uchukagakugijutsukoen-kakikoenshu", pp. 334–335.
Document 3: "Dai 31 Kai Uchukagakugijutsukoen-kaikoenshu", pp. 256–257.
Document 4: "Dai 31 Kai Uchukagakugijutsukoen-kaikoenshu", pp. 398–399.
Document 5: "Dai 31 Kai Uchukagakugijutsukoen-kaikoenshu", pp. 258–259.

*Primary Examiner*—Richard E. Chilcot, Jr.
*Assistant Examiner*—Joanne C. Downs
*Attorney, Agent, or Firm*—Lowe, Price, Leblanc & Becker

[57] ABSTRACT

A vibration control system for a structure comprises an actuator connected in a truss structure as a structural member, for varying an axial stiffness in response to a control signal, at least one vibration sensor for producing a sensor signal representing a vibratory motion of the structure, and a controller for controlling vibrations of the structure by producing the control signal in accordance with the sensor signal. Preferably, the actuator comprises inner and outer tubes axially movable relative to each other, and a piezoelectric element which can change the axial stiffness of the actuator by allowing and preventing the relative movement between the inner and outer tubes.

27 Claims, 12 Drawing Sheets

ACTUATOR AND SYSTEM FOR CONTROLLING VIBRATION OF STRUCTURE

BACKGROUND OF THE INVENTION

The present invention relates a vibration control system for a structure such as a space structure, and an actuator which can be used in such a vibration control system.

A document 1 (Dai 31 Kai Uchukagakugijutsukoenkaikoenshu (1987) pages 400 and 401) shows a conventional vibration control system which employs a cantilever as a simulation model of a space structure. The vibration control system of this example has at least one piezoelectric element attached to one side of the cantilever so that the piezoelectric element elongates in the longitudinal direction, and a controller for damping vibrations of the cantilever by controlling a voltage applied on the piezoelectric element so as to control a longitudinal displacement of the cantilever.

However, this control system is not effective against vibrations of large amplitudes because the amount of change in length produced by the piezoelectric element is very small (about 10 micrometer).

Some other vibration control systems are disclosed in document 2 (Dai 32 Kai Uchukagakugijutsukoenkaikoenshu, pages 334 and 335), document 3 (Dai 31 Kai Uchukagakugijutsukoenkaikoenshu, pages 256 and 257), and document 4 (Dai 31 Kai Uchukagakugijutsukoenkaikoenshu, pages 398 and 399) and document 5 (Dai 31 Kai Uchukagakugijutsukoenkaikoenshu, pages 258 and 259).

SUMMARY OF THE INVENTION

It is an object of the present invention to provide a vibration control system which can efficiently control vibration of a structure even when the amplitude of the vibration is great.

It is another object of the invention to provide an actuator which can be used in such a vibration control system.

According to the present invention, a vibration control system for a structure such as a space structure, comprises at least one actuator, to be connected in the structure as a structural member, for varying an axial stiffness in response to a control signal, a vibration sensing means for responding to vibration of the structure and producing at least one sensor signal, and a controller for producing the control signal in accordance with the sensor signal.

In preferred embodiments of the invention, the actuator has the following characteristic. If the axial stiffness is decreased from a high value to a low value when an axial force of a first magnitude is applied on the actuator, the axial force is decreased to a magnitude lower than the first magnitude, and the axial force remains lower than the first magnitude even after the axial stiffness is increased again to the high value. Therefore, it is possible to decrease an axial force applied on the actuator by decreasing the axial stiffness from the high value to the low value, and then restoring the axial stiffness to the high value.

DETAILED DESCRIPTION OF THE INVENTION

A first embodiment of the present invention is shown in FIGS. 1-8.

Figure 1:
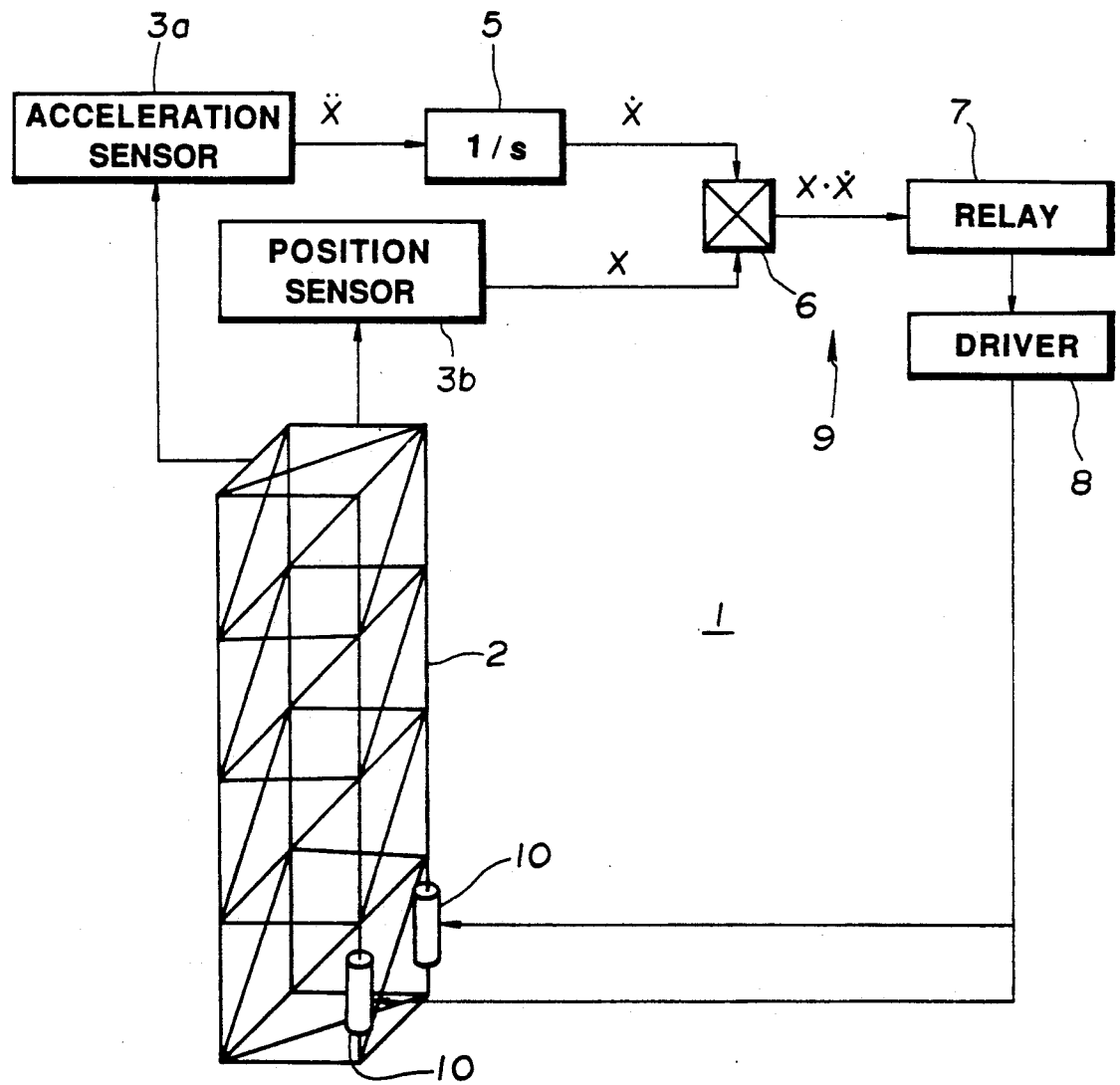
FIG. 1 is a functional block diagram showing a vibration control system according to a first embodiment of the invention.

FIG. 1 schematically shows a vibration control system 1 of the first embodiment, for a truss structure (truss beam structure) 2 of a space station or the like. The vibration control system 1 of this embodiment includes at least one acceleration sensor (accelerometer) 3a, at least one position sensor 3b, a controller 9, and at least one actuator 10. In this embodiment, there are provided two actuators 10. The acceleration sensor 3a senses a vibration acceleration of the truss structure 2, and produces an acceleration signal representing the sensed acceleration $\ddot{x}$. The position sensor 3b senses a displacement of the truss structure 2, and produces a displacement signal representing the sensed displacement x.

The controller 9 of this embodiment produces a control signal in accordance with the acceleration signal and the displacement signal, and delivers the control signal to the actuators 10. The controller 9 of this embodiment includes an integrating section (integrator) 5, a multiplying section (multiplier) 6, a relay 7, and a driver (driving circuit) 8. The integrating section 5 receives the acceleration signal from the acceleration sensor 3a, and produces a velocity signal representing a velocity $\dot{x}$, by integrating the acceleration signal. The multiplying section 6 receives the velocity signal from the integrating section 5 and the displacement signal from the position sensor 3b, and produces a product signal representing a product x·ẋ obtained by multiplying the displacement x by the velocity ẋ. The relay 7 is connected with the multiplying section 6, and arranged to be in a first state when the product x·ẋ of the displacement and the velocity is equal to or greater than zero (x·ẋ ≧ 0), and in a second state when the product is smaller than zero. The driving circuit 8 sends, to the actuators 10, the control signal which is in a first signal state when the relay 7 is in the first state, and which is in a second signal state when the relay 7 is in the second state.

Figure 2:
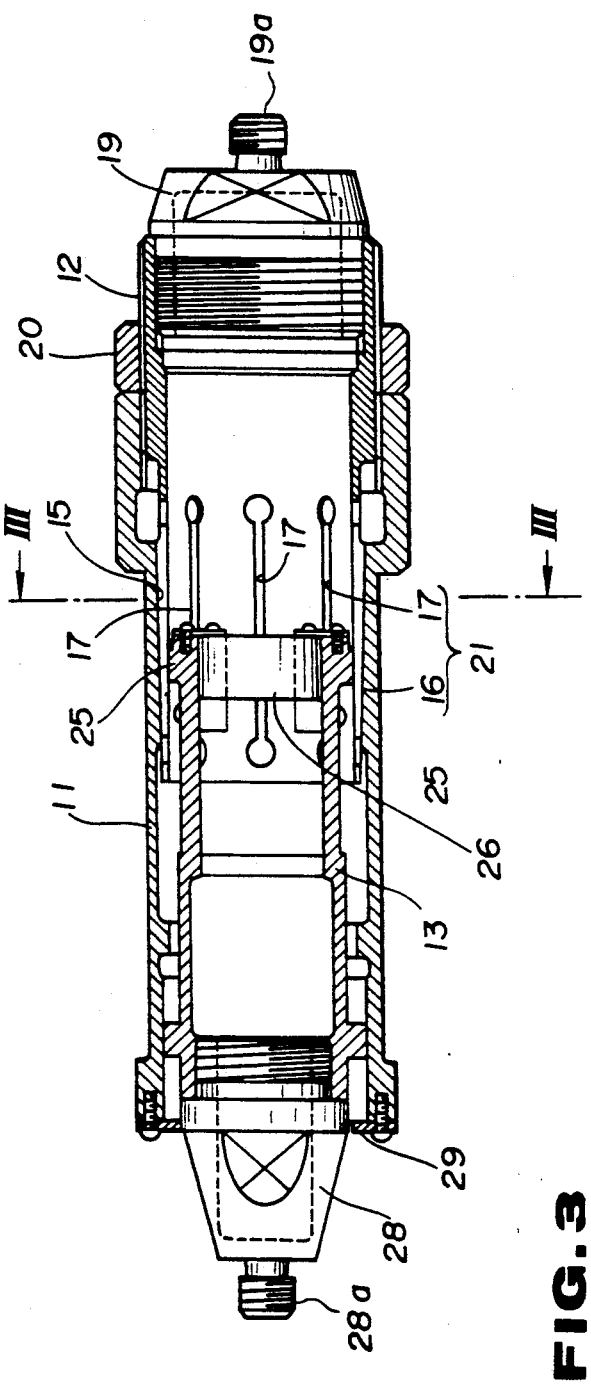
FIG. 2 is a sectional view of an actuator used in the vibration control system shown in FIG. 1.
Figure 4:
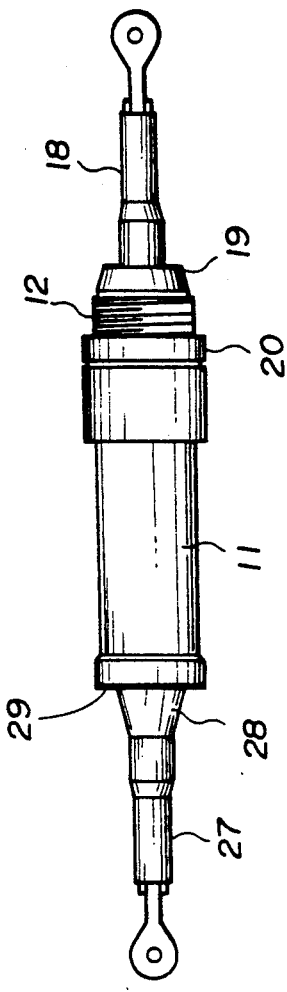
FIG. 4 is a front elevation of the actuator.
Figure 3:
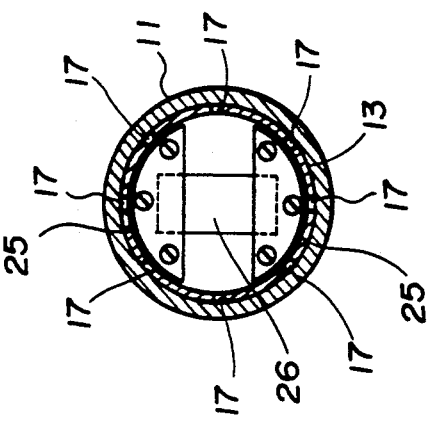
FIG. 3 is a sectional view of the actuator, taken along a line III—III of FIG. 2.
Figure 5:
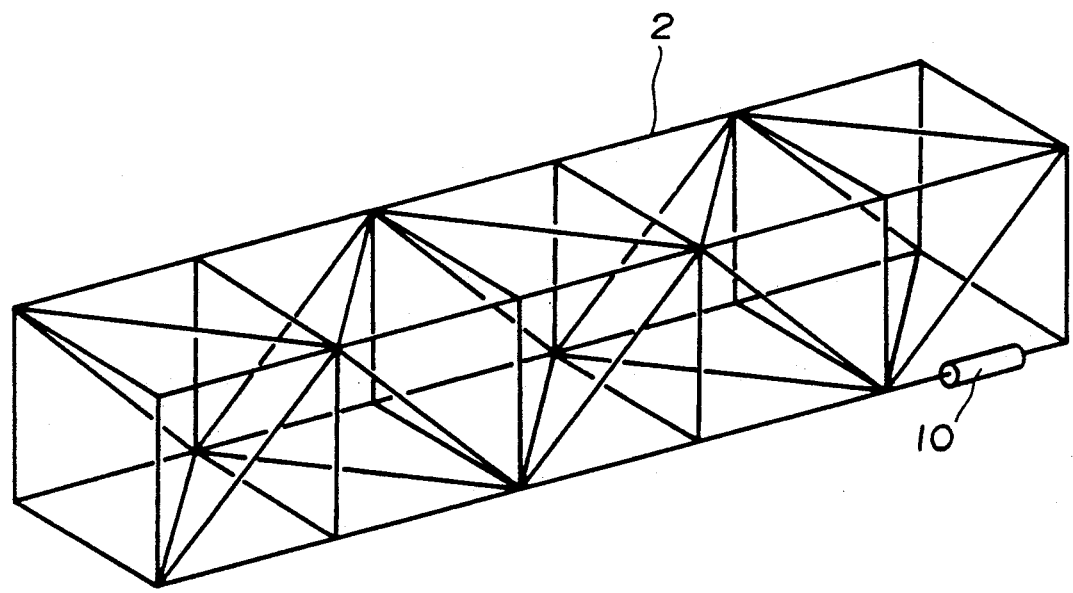
FIG. 5 is a schematic perspective view showing a truss structure.

Each of the actuators 10 of this control system forms a variable stiffness active member shown in FIGS. 2-4. Each actuator 10 includes a case 11, and first and second parts which are axially movable relative to each other. In this embodiment, the first and second parts are an outer tube 12 and an inner tube 13. The inner tube 13 is partly received in the outer tube 12 in a telescopic manner, and both tubes are enclosed in the case 11. The outer tube 12 is screwed into a bore of the case 11. A first end of the inner tube 13 is fitted in a first end of the outer tube 12 in such a manner that the inner tube 13 is axially slidable relative to the outer tube 12. A second end of the inner tube 13 is supported axially slidably by the case 11. A second end of the outer tube 12 projects outwardly from the case 11. The first end of the outer tube 12 is situated on the left side as viewed in FIG. 2, and the second end is on the right side. As to the inner tube 13, the first end is on the right side, and the second end is on the left side.

The case 11 has a radially inwardly facing inside taper surface 15 formed in the bore. The outer tube 12 has a radially outwardly facing outside taper surface 16. Each of the inside and outside taper surfaces 15 and 16 is substantially in the form of a conical surface of a frustum of a right circular cone whose axis is coincident with the axis of the actuator 10, and whose vertex and base are so located that the vertex is at the left, and the base is at the right in FIG. 2. The outside taper surface 16 of the outer tube 12 abuts on the inside taper surface 15 of the case 11. The outside taper surface 16 is formed near the first (lefthand) end of the outer tube 12. The outer tube 12 has a plurality of slits 17 formed in the outside taper surface 16. The slits 17 extend axially as shown in FIG. 2, and they are arranged in a circle around the axis of the outer tube 12 at regular intervals as shown in FIG. 3. The slits 17 are designed to endow the outer tube 13 with elasticity. A plug 19 is screwed into the second end of the outer tube 12. The plug 19 has a threaded portion 19a used for fastening a connector 18 to the second end of the outer tube 12. The outer tube 12 is fixed to the case 1 by a lock nut 20. The taper surfaces 15 and 16 and the slits 17 constitute an adjusting mechanism 21 for adjusting the inside diameter of the outer tube 12. As the outer tube 12 is screwed deeply into the case 11, the inside diameter of the outer tube 12 is decreased in conformity with the taper surface 15 of the case 11. In this embodiment, the inside diameter of the outer tube 12 is adjusted so that the separation (difference in radius) between the inner and outer tubes 13 and 12 is equal to about 10 μm (micrometer).

The inner tube 13 has a two-pronged sliding portion 25 formed at the first end. The sliding portion 25 is divided into two segments which are separated radially from each other, and arranged symmetrically with respect to the axis of the inner tube 13, as shown in FIG. 3. The sliding portion 25 of the inner tube 13 is fitted in the outer tube 12, and axially slidable on the inside surface of the outer tube 12. The sliding portion 25 is flexible so that the two segments can be easily separated further apart. A piezoelectric element 26 is provided in the inner tube 13. The piezoelectric element 26 serves as an active element of an active means. The two segments of the sliding portion 25 are connected with each other by the piezoelectric element 26. The piezoelectric element 26 is arranged to deform so as to separate the two segments of the sliding portion 25 further apart in the radial direction when a voltage is applied. The piezoelectric element 26 is made of a piezoelectric material such as piezoelectric ceramics. When energized, the piezoelectric element 26 pushes each segment of the sliding portion 25 in the radial outward direction, so that the outside circumferential surfaces of the sliding portion 25 are pressed on the inside circumferential surface of the outer tube 12. A plug 28 is screwed into the second end of the inner tube 13. The plug 28 has a threaded portion 28a. A connector 27 is screwed to the threaded portion 28a of the plug 28. The connector 27 is attached to the inner tube 13 through the plug 28, as shown in FIG. 4. The connectors 18 and 27 are used for connecting the actuator 10, as a member of the truss structure 2, with the neighboring truss members. A stopper 29 is fixed to the case 11. The stopper 29 limits the axial movement of the inner tube 13, and prevents extraction of the inner tube 13 from the case 11.

Figure 6A:
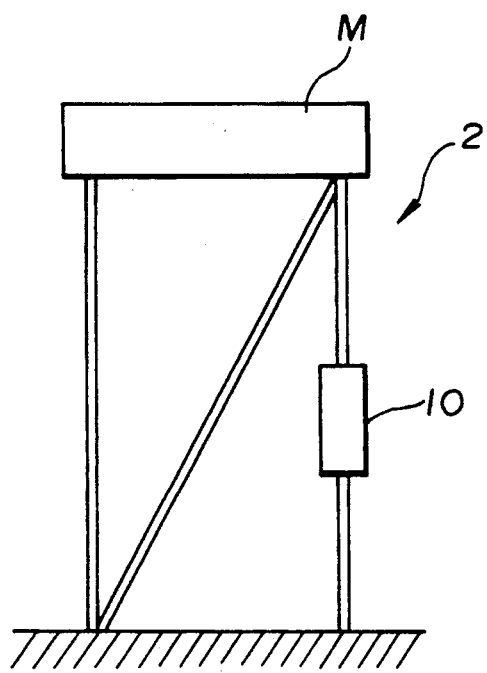
FIG. 6A is an illustration showing a simplied model of the truss structure.
Figure 6B:
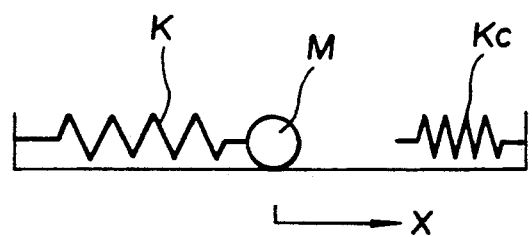
FIG. 6B is a vibration system equivalent to the truss structure model shown in FIG. 6A.

The vibration control system 1 of the first embodiment is operated as follows:

In FIG. 6A, the truss structure 2 is simplified into a cantilever structure to facilitate explanation. The simplified truss structure 2 shown in FIG. 6A possesses a mass M, a damping factor (damping constant) D of the truss structure 2, a stiffness K of the truss structure 2, and a control stiffness Kc which is produced when the piezoelectric element 26 of the actuator 10 is energized. FIG. 6B shows a two-dimensional model equivalent to the structure 2 shown in FIG. 6A. This model is expressed by:

$$M \cdot \ddot{x} + D \cdot \dot{x} + K \cdot x + Kc \cdot x = 0 \tag{1}$$

where x is the displacement of the mass from its normal position in the right and left direction as viewed in FIG. 6A, ẋ is the velocity, and ẍ is the acceleration. In general, the damping factor D of the truss structure is small, and the velocity feedback control is effective for increasing the damping factor D. The velocity feedback is expressed as:

$$Fc = -f \cdot \dot{x} \tag{2}$$

In order to simulate f·ẋ of the equation (2) by Kc·x, the following equation is required:

$$Kc \cdot x = f \cdot \dot{x}$$

Therefore, $$Kc = f \cdot \frac{\dot{x}}{x} \quad (f > 0) \tag{3}$$

The control system of this embodiments is an on-off control system in which the control stiffness Kc is either zero or a predetermined constant value. Accordingly, it is possible to increase the damping by making the control stiffness equal to Kc (constant) when the product of the displacement x and the velocity is equal to or greater than zero ($x \cdot \dot{x} \geq 0$), and making the control stiffness equal to zero when the product is smaller than zero ($x \cdot \dot{x} < 0$).

Figure 7A:
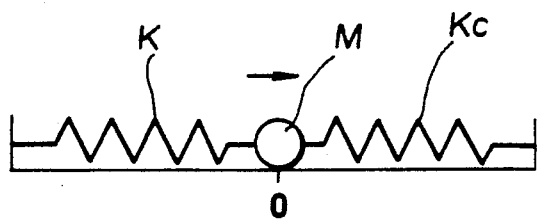
FIG. 7A-7F are views of the vibration system shown in FIG. 6B, in various operating states.
Figure 7B:
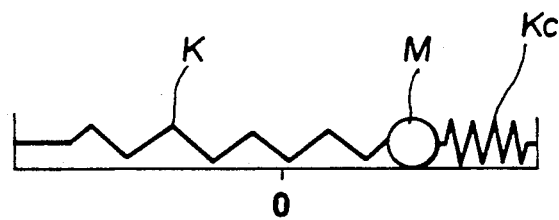

FIGS. 7A–7F show a vibratory motion of the mass M of the model shown in FIG. 6B. In a state shown in FIG. 7A, the mass M is moving in a rightward direction in FIG. 7A while the truss structure 2 is in a swing motion in one direction due to a large amplitude vibration. In this state, the product of the displacement and velocity are equal to or greater than zero, and therefore, the controller 9 of the first embodiment makes the control stiffness equal to the positive value by energizing the piezoelectric element 26. The piezoelectric element 26 is held in the ON state until a state shown in FIG. 7B is reached. When the product of the displacement and the velocity becomes lower than zero, the controller 9 changes the actuator 10 from a high stiffness state to a low stiffness state. In a state shown in FIG. 7C, the product of the displacement and the velocity is lower than zero, and therefore, the actuator 10 is held in the low stiffness state. When the mass M reaches a position shown in FIG. 7D, the product of the displacement and the velocity becomes equal to or greater than zero, and therefore, the controller 9 increases the axial stiffness of the actuator 10 again. The axial stiffness is held high until the mass reaches a position shown in FIG. 7E. In a state shown in FIG. 7F, the product is lower than zero, and the control stiffness Kc is held equal to zero.

Figure 7C:
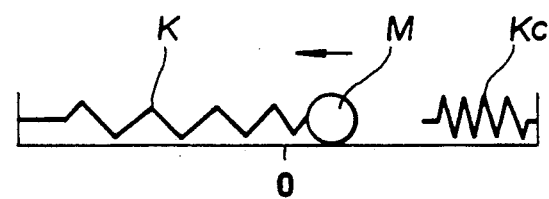
Figure 7D:
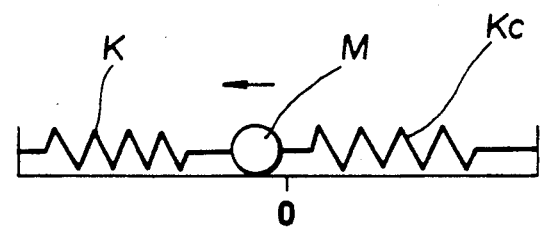
Figure 7E:
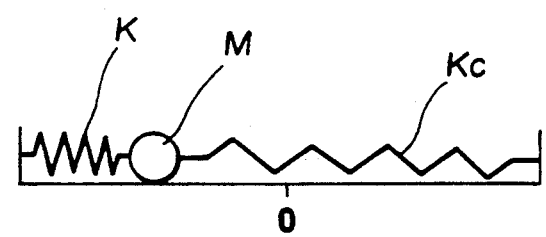
Figure 7F:
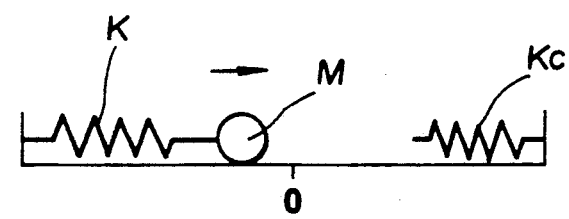

When the axial stiffness of the actuator 10 is changed, the energy of a large amplitude vibration of the truss structure 2 is converted into a high frequency vibration, which is, in turn, damped easily by the truss structure. Thus, the vibration control system of the invention can rapidly dissipate the energy in vibrations of the truss structure 2 by converting the vibratory energy to high frequency vibrations. Especially when the actuator 10 is in the low stiffness state as shown in FIGS. 7C and 7F, the energy stored in the control stiffness Kc is consumed by elastic vibrations of the truss members.

Figure 8A:
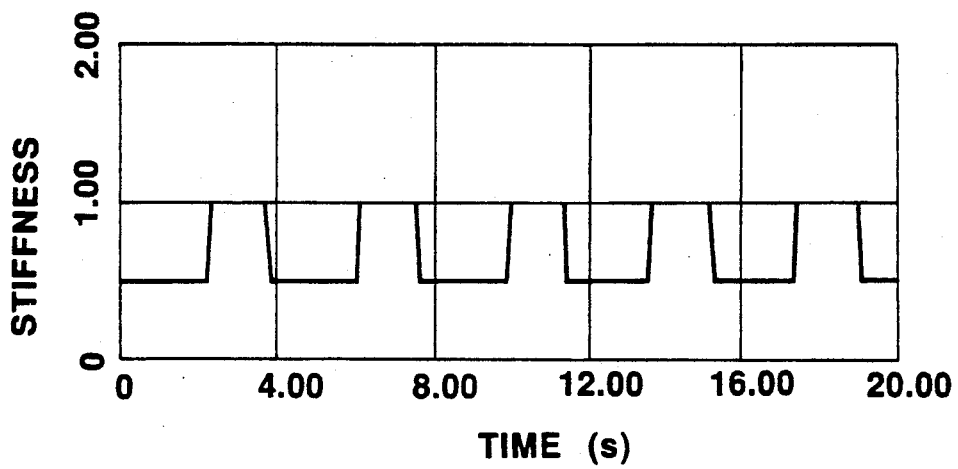
FIGS. 8A-8C are graphs for showing operations of the vibration control system of the first embodiment.
Figure 8B:
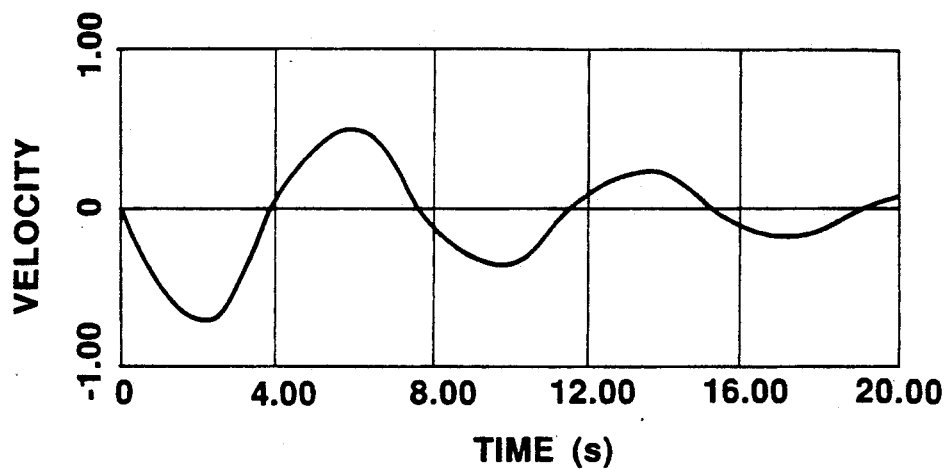
Figure 8C:
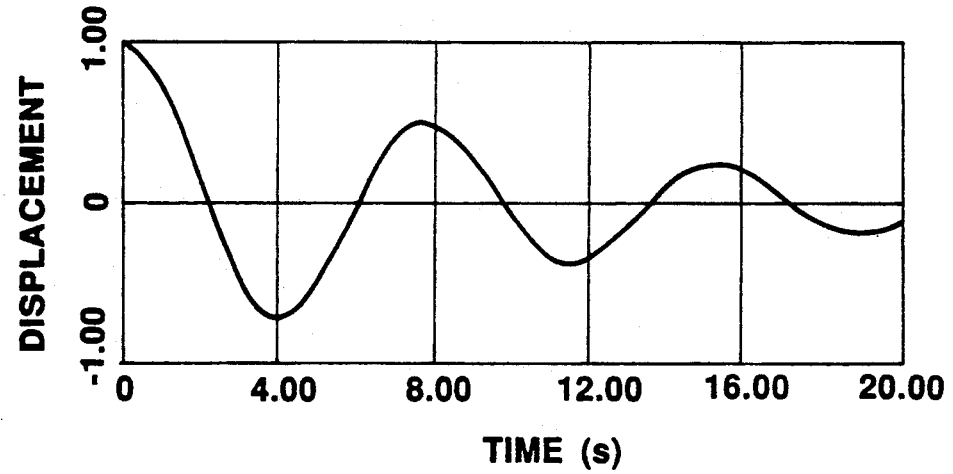

FIGS. 8A–8C show effects of the vibration control system of the first embodiment. In this example, the axial stiffness is reduced to half in the low stiffness state, and K=Kc. As shown in FIGS. 8A–8C, the vibration control system of the invention can effectively decrease the amplitude of the vibration by alternately changing the axial stiffness between the high and low values.

When a friction is produced between the outer and inner tubes 12 and 13 to increase the axial stiffness by energizing the piezoelectric element 26, an inertial force of the truss structure 2 may cause slippage between the outer and inner tubes 12 and 13. In this case, the vibration is further damped by a braking effect.

In this embodiment, the actuator 10 employs the piezoelectric element 26. Therefore, the power consumption is very low, and the load on the power source is increased only by a very small amount.

Actual vibrations of the truss structure 2 in space are not so simple but extremely complicated. However, any complicated vibration can be decomposed into simple components which can be simulated by two dimensional models. Therefore, it is possible to suppress any complicated vibration by providing a plurality of sets each including one or more actuators 10 and one or more vibration sensors, and controlling the actuators of each set in accordance with the output signals of the associated sensors, independently of the other sets.

Figure 9:
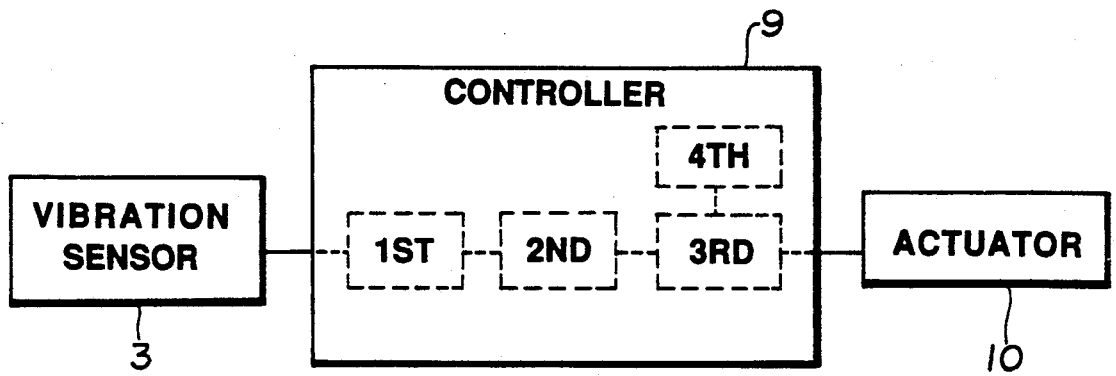
FIG. 9 is a block diagram of a vibration control system according to a second embodiment of the invention.

The control system of the first embodiment employs the position sensor 4 and the acceleration sensor 3. However, it is possible to determine the displacement x by integrating the acceleration signal $\ddot{x}$ twice A second embodiment of the present invention is schematically shown in FIG. 9. A vibration control system of the second embodiment is designed to suppress vibrations of the truss structure 2 by repeating a control operation which causes a momentary decrease in the axial stiffness.

As shown in FIG. 9, the vibration control system 1 of the second embodiment comprises a vibration sensing means comprising at least one vibration sensor 3, a controller 9, and an actuating means comprising at least one actuator 10. In the second embodiment, the vibration sensing means includes an acceleration sensor 3a and a position sensor 3b, as in the first embodiment. The actuator 10 of the second embodiment is identical in construction to the actuator 10 shown in FIGS. 2–4. The controller 9 may comprise a computer as a main component, or may comprise analog circuits.

Figure 10A:
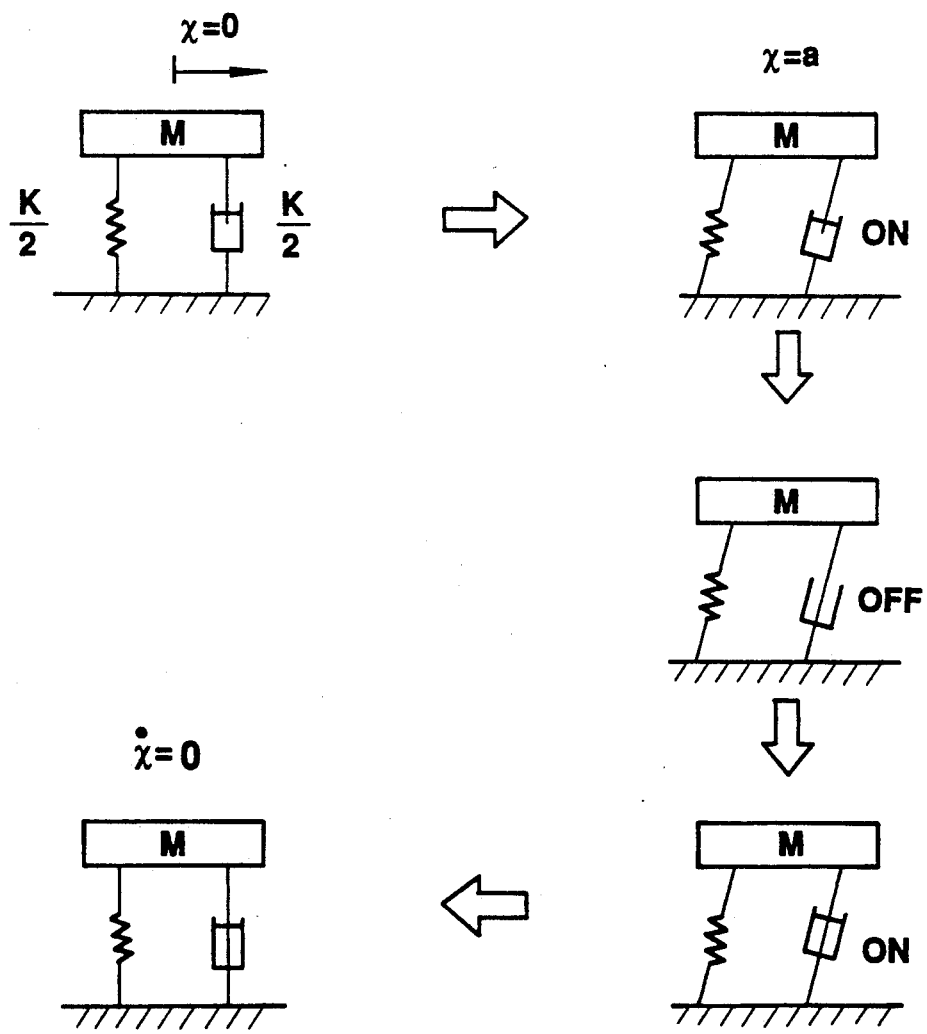
FIG. 10A is an illustration for showing operations of the vibration control system of the second embodiment.

FIG. 10A shows operations of the controller 9 of the second embodiment by using a simplified model. When the mass M reaches a peak position where the displacement x is equal to a maximum displacement a, the controller 9 of the second embodiment turns off the actuator 10 and holds the actuator 10 in the OFF state only for a very short time duration. During this, the actuator 10 becomes slightly shorter, and the energy of an axial force fa applied on the actuator 10 in the axial direction is converted to a high frequency vibration, and dissipated in the truss structure. By this energy loss, the axial force fa becomes smaller. Then, the mass M swings back to the original position where the displacement x is zero. When the mass M reaches the original position, the velocity $\dot{x}$ becomes approximately equal to zero because the axial force has been decreased at the peak position where x=a. At this instant, the controller 9 turns off the actuator 10 again, and holds the actuator 10 in the OFF state for the very short duration. In this way, the controller 9 of the second embodiment normally holds the actuator 10 in the ON state having the high axial stiffness value, and puts the actuator 10 in the OFF state momentarily by producing an impulse in the control signal each time either the displacement or the velocity becomes equal to zero. In this case, the actuator 10 is so adjusted that the axial stiffness of the variable stiffness member is equal to K when the piezoelectric element 26 is energized to prevent the axial movement between the inner and outer tubes 13 and 12, and equal to a difference resulting from subtraction from K, of a decrement ΔK (delta K) which is equal to K/2, when the piezoelectric element 26 is deenergized.

When the decrement ΔK is greater than the half of K, the controller 9 is arranged to produce the impulse to decrease the axial stiffness momentarily each time the displacement x becomes equal to either of a first value which is equal to zero, and a second value which is equal to a product obtained by multiplying a maximum displacement (amplitude) a by a coefficient lambda. The coefficient lambda is equal to the square root of a fraction whose numerator is equal to K and whose denominator is equal to 2 times delta K. That is:

$$\lambda = \sqrt{\frac{K}{2\Delta K}}$$

Figure 10B:
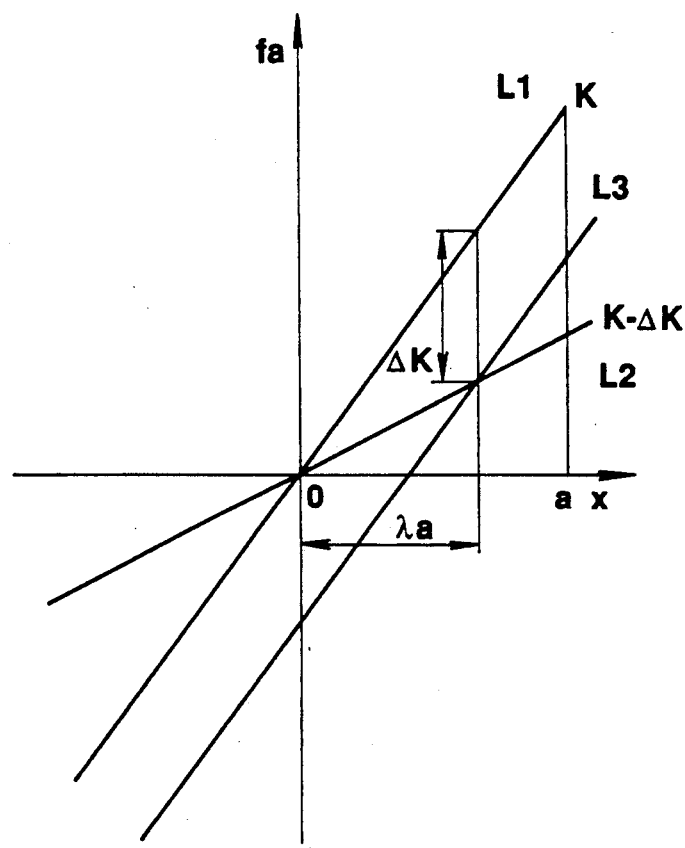
FIG. 10B is a graph showing operations of the vibration control system of the second embodiment.

FIG. 10B shows relationships between an axial force fa acting on the actuator 10 in the axial direction and a displacement x of the mass M of the simplified model shown in FIG. 6A. A first straight line L1 expresses a typical vibration experienced by the truss structure 2 when the actuator 10 is held in the high stiffness state. In this vibration, the mass M swings right and left in FIG. 6A. The first straight line L1 passes through the origin 0. When, on the other hand, the axial stiffness is held equal to the low value $K-\Delta K$, the truss structure 2 vibrates along a second straight line L2 whose slope is decreased by delta K as compared with the first line L1. In this example, the controller 9 decreases the stiffness of the truss structure 2 from K to $K-\Delta K$ by cutting off the power supply to the piezoelectric element 26 when the displacement x of the truss structure 2 vibrating along the first straight line L1 becomes equal to the second value (=lambda times a). In a very short time, the controller 9 restores the actuator 10 to the high stiffness state. This momentary decrease in the axial stiffness causes a conversion of the energy of the axial force acting on the actuator 10 into the energy of a high frequency vibration, and by so doing, decreases the magnitude of the axial force fa. The energy of the high frequency vibration is readily absorbed by the truss structure. As a result, the truss structure 2 starts vibrating along a third straight line L3 which does not pass through the origin 0. Therefore, the magnitude of the axial force fa acting on the actuator 10 is equal to an initial high value immediately before the momentary decrease, and the magnitude of the axial force fa is equal to a low value lower than the initial high value even after the axial stiffness is increased again to the high value K. After the momentary decrease of the axial stiffness, the truss structure 2 vibrates along the third line L3 whose slope is equal to K, in the state in which the axial force fa is decreased. When the truss structure 2 swings along the straight line L3, and the displacement x becomes equal to zero again, then the controller 9 produces the impulse to decrease the axially stiffness momentarily. Therefore, the axial force fa is further decreased at the zero displacement position, and the truss structure 2 returns to the first straight line L1. In this way, the vibration control system can rapidly reduce the axial force fa to zero, and damp the vibration of the truss structure 2.

When the decrement delta K is smaller than K/2, the controller 9 is arranged to decrease the axial stiffness in the momentary manner each time the velocity $\dot{x}$ of the structure 2 becomes equal to zero.

When the decrement delta K is equal to K/2, it is possible to construct the controller 9 so that the axial stiffness is decreased momentarily each time the velocity x becomes equal to zero, or each time either the displace or the velocity becomes equal to zero, or each time the product of the displacement and the velocity becomes equal to zero.

As shown in FIG. 9, the controller 9 of the second embodiment comprises first, second, third and fourth means (sections). The first means receives one or more signals from the vibration sensors 3, and produces at least one oscillating signal indicative of the vibratory motion of the truss structure 2 sensed by the sensors 3. In the second embodiment, the first means of the controller 9 produces the product signal representing the product of the displacement and the velocity. The second means is designed to determine whether a predetermined condition is satisfied by the oscillating signal of the first means. The third means produces one impulse each time the predetermined condition is satisfied. In the second embodiment, the third means produce one impulse each time the product becomes equal to zero. The fourth means of the controller 9 comprises a device for measuring time, and is used for determining the pulse duration of the control signal.

In the present invention, it is possible to replace the acceleration sensor 3a and the position sensor 3b by one or more vibration sensors of a type capable of directly sensing the axial force fa acting on the actuator 10 in the axial direction. In this case, the vibration control system employs a device, such as a strain gage including a load cell, for measuring forces.

Figure 11:
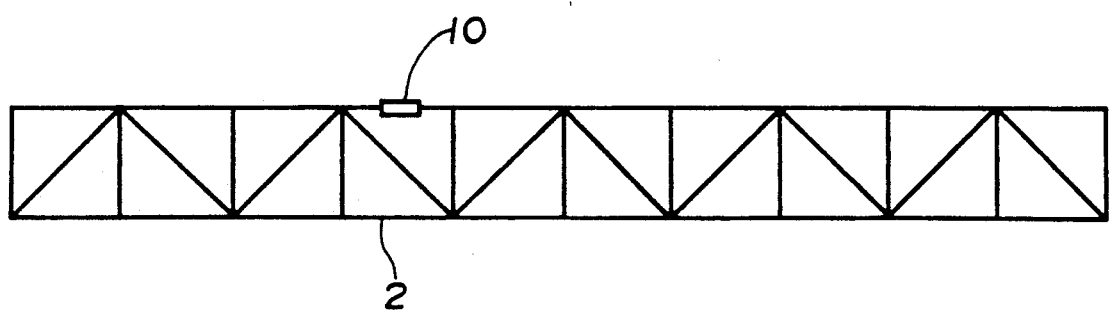
FIG. 11 is a schematic view showing a truss structure used in a simulation of a third embodiment of the invention.
Figure 12:
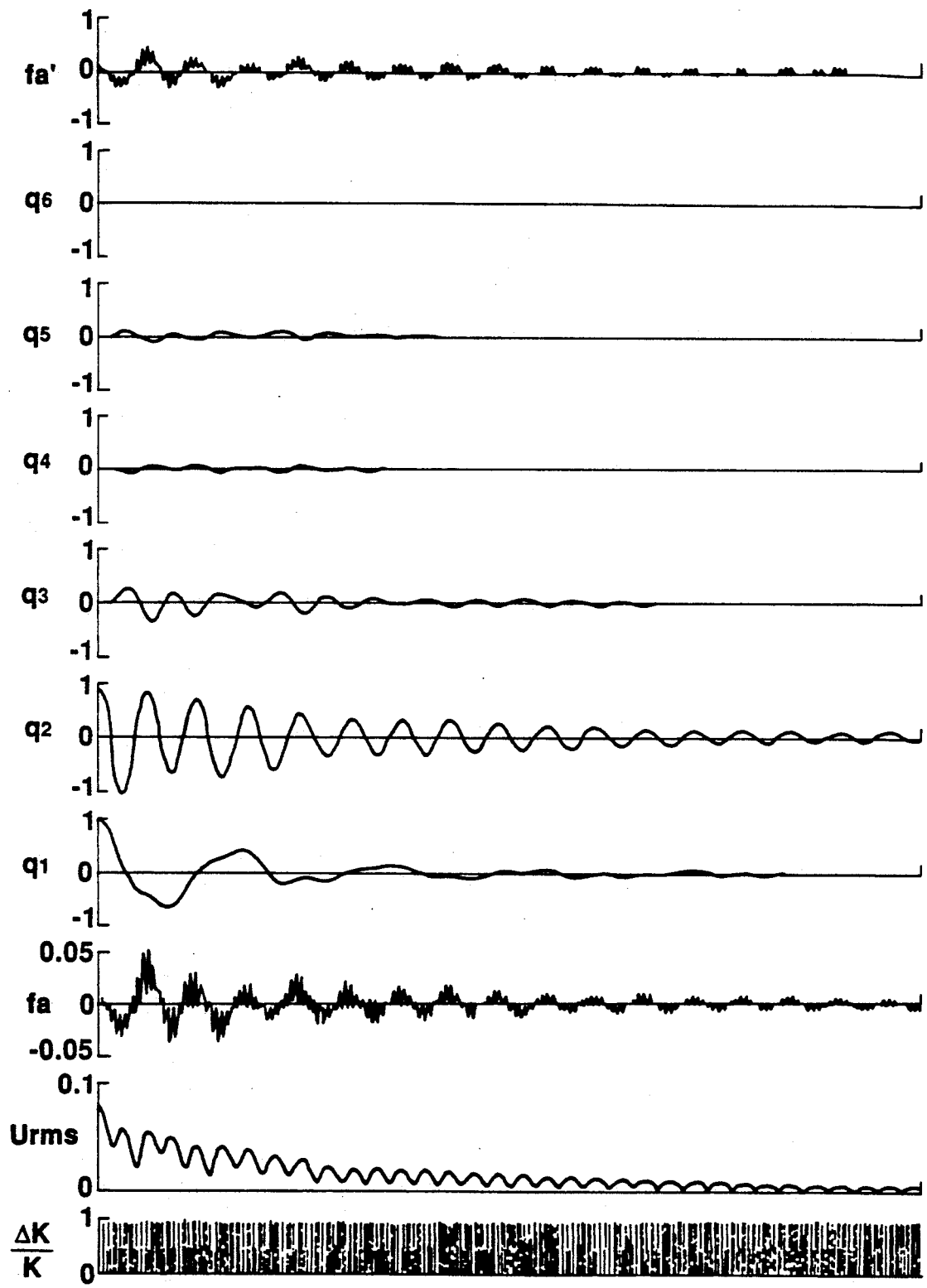
FIG. 12 is a diagram showing results of the simulation according to the third embodiment of the invention.

A third embodiment of the invention is shown in FIG. 12. A vibration control system of the third embodiment is similar to the vibration control system of the second embodiment. However, the controller 9 of the third embodiment is arranged to deenergize the piezoelectric element 26 when the product (fa·fa) of the axial force fa and the first derivative of the axial force with respect to time becomes smaller than zero (that is, the axial force is not increasing) after the expiration of a predetermined ON period $\tau_c$ during which the piezoelectric element 26 is held in the energized state. Then, the controller 9 restores the piezoelectric element 26 to the energized state at the end of a predetermined OFF period $\tau_f$. Thus, the controller 9 of the third embodiment decreases the axial stiffness of the actuator 10 momentarily by producing an impulse in the control signal each time the product of the axial force and the time rate of change of the axial force becomes smaller than zero after the expiration of the predetermined ON period. FIG. 12 shows the results obtained by simulation of a multi-degree of freedom system composed of the truss structure 2 shown in FIG. 11. In the truss structure 2 shown in FIG. 11, the length of each perpendicular truss member equals 1 m; the length of each diagonal truss member equals 1.41 m (the square root of 2); the mass per unit length of each truss member equals 1 kg; and the stiffness of each truss member equals 0.1 kgf/m. The truss structure 2 shown in FIG. 11 is in a free state with no constraint. In the third embodiment, the ON Period $\tau_c$ equals 3 sec, the OFF period $\tau_f$ equals 2 sec, and the ratio of the decrement delta K to K is set equal to 0.9.

The controller 9 of the third embodiment decreases the axial stiffness of the variable stiffness member of the truss structure each time the axial force fa is applied on the variable stiffness member, and a sufficient energy of the axial force fa is accumulated in the variable stiffness member (that is, when fa·fa<0). In this case, the axial force is released, and converted into a high frequency vibratory energy which the truss structure can readily absorb. In this way, the vibration control system of the third embodiment can efficiently damp the vibrations of the truss structure 2 as shown in FIG. 12. As shown in FIG. 12, the rms value Urms of the displacement from a reference position is decreased rapidly, and the truss structure 2 is not vibrated sharply in any of modes q1-q6.

Like the controller shown in FIG. 9, the controller 9 of the third embodiment comprises a first means for producing signal representing the product of fa and fa, a second means for determining whether the product is smaller than zero, a third means for producing the control signal, and a fourth means for measuring time.

Figure 13:
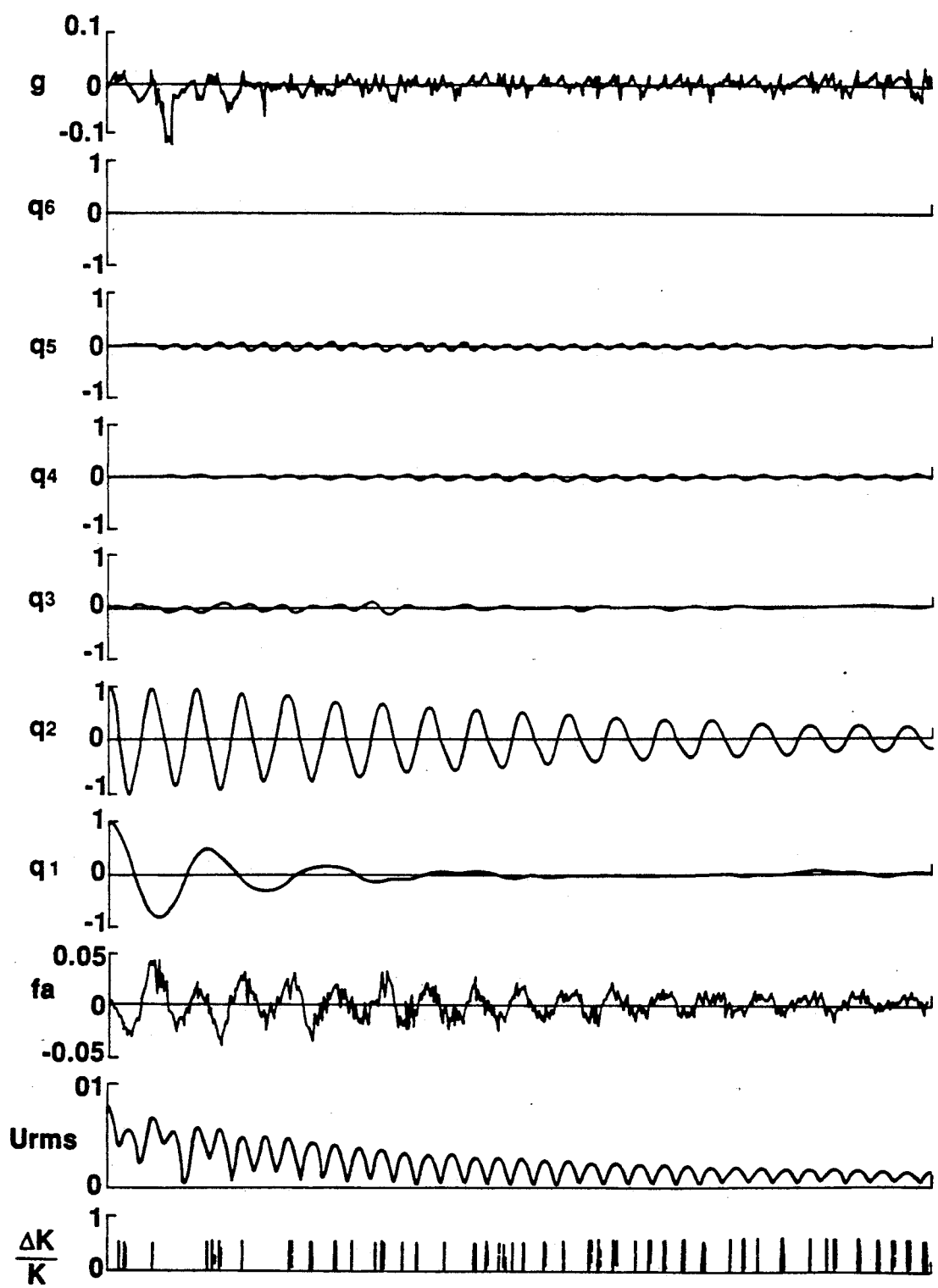
FIG. 13 is a diagram showing results of a simulation according to a fourth embodiment of the invention.

A fourth embodiment of the invention is shown in FIG. 13. FIG. 13 shows the results obtained by simulation of the multi-degree of freedom system composed of the truss structure 2 shown in FIG. 11. The controller 9 of the fourth embodiment is designed to decrease the axial stiffness by deenergizing the piezoelectric element 26 when an oscillating variable g is greater than a predetermined value $\epsilon$(epsilon) and at the same time a first derivative of g with respect to time is smaller than zero ($g > \epsilon$ and $\dot{g} < 0$) after the expiration of a predetermined ON period during which the axial stiffness is held at a high value. Then, the controller 9 restores the piezoelectric element 6 to the energized state at the end of a predetermined OFF period during which the axial stiffness is held at a low value. In this way, the controller 9 of the third embodiment repeats the momentary decrease of axial stiffness.

The oscillating variable g of the third embodiment is defined by any one of the following three equations.

$$g = \gamma_1 - \gamma_2 \quad \text{(a)}$$

$$g = (\gamma_1 - \gamma_2)/\gamma_1 \quad \text{(b)}$$

$$g = (\sqrt{\gamma_1} - \sqrt{\gamma_2})/\sqrt{\gamma_1} \quad \text{(c)}$$

The fourth embodiment employs the oscillating variable g defined by the equation (c).

In these equations, $\gamma_1$ and $\gamma_2$ are given by;

$$\gamma_1 = \sum_{i=1}^{n} W_i(q_{i\tau})^2$$

$$\gamma_2 = \sum_{i=1}^{n} W_i(\bar{q}_{i\tau})^2$$

The quantities expressed by Wi are positive coefficient used as weights. In this embodiment, Wi is given by;
$$W_i = \phi_i^T \phi_i$$

In the above equations, $q_{i\tau}$, $\bar{q}_{i\tau}$, are given by the following equations;

$$q_{i\tau} = \frac{f_{oi}}{w_i^2} + \left(q_i - \frac{f_{oi}}{w_i^2}\right) \times \cos(w_i \tau_i) + \frac{\dot{q}_i}{w_i} \sin(w_i \tau_i)$$

$$\bar{q}_{i\tau} = \frac{\bar{f}_{oi}}{w_i^2} + \left(q_i - \frac{\bar{f}_{oi}}{w_i^2}\right) \times \cos(w_i \bar{\tau}_i) + \frac{\dot{q}_i}{w_i} \sin(w_i \bar{\tau}_i)$$

$$\tau_i = \frac{1}{w_i} \tan^{-1} \frac{\dot{q}_i}{w_i \left(q_i - \frac{f_{oi}}{w_i^2}\right)}$$

$$\bar{\tau}_i = \frac{1}{w_i} \tan^{-1} \frac{\dot{q}_i}{w_i \left(q_i - \frac{\bar{f}_{oi}}{w_i^2}\right)}$$

The equations $f_{oi}$, $\bar{f}_{oi}$, $q_i$ and $q_{oi}$ are, respectively, ith components of vectors $f_o$, $\bar{f}_o$, q and $q_o$.
$$f_o = \Phi^T \Delta K \Phi q_o, \bar{f}_o = \Phi^T \Delta K \Phi q$$

q = a current displacement in a modal coordinate system.

$q_o$ = a displacement in the modal coordinate system at an instant at which the high stiffness state has been resumed most recently K = a stiffness matrix of the system in the high stiffness state in a physical coordinate system.

K − ΔK = a stiffness matrix of the system in the low stiffness state in the physical coordinate system.

M = a mass matrix in the physical coordinate system.

$\omega_i^2$ = an ith eigenvalue of $\omega^2 M\phi + K\phi = 0$.

$\phi_i$ = an eigenvector which corresponds to $\omega_i^2$ and which is normalized so that $\phi_i^T M \phi_i = 1$.

$$\Phi = (\phi_1, \phi_2, \ldots, \phi_m)$$

m = the number of degrees of freedom of the model in the modal coordinate system.

FIG. 13 shows the results of the simulation in which g is defined by the equation (c), the ON period $\tau_c$ is 3 sec, the OFF period $\tau_f$ is 2 sec, the ratio ($\Delta K/K$) of the decrement $\Delta K$ (delta K) to K is 0.5, and the predetermined value $\epsilon$(epsilon) is 0.02.

In this way, the vibration control system of the fourth embodiment normally holds the variable stiffness member in the high stiffness state of the high stiffness K, and puts the variable stiffness member in the low stiffness state of K − ΔK only for the predetermined short duration $\tau_f$ each time g becomes greater than the predetermined value $\epsilon$(epsilon) and at the same time the first derivative of g becomes smaller than zero after the expiration of the predetermined minimum ON duration. By so doing, the vibration control system of the fourth embodiment efficiently decreases the rms value Urms, and damps each of the first through sixth modes $q_1 - q_6$.

In the third and fourth embodiments, the vibration sensing means may comprises a plurality of sensor sets each of which includes a position sensor for sensing the displacement of a predetermined position of the truss structure, and an acceleration sensor for sensing the acceleration of a position substantially coincident to the measuring position of the position sensor. The sensor sets are positioned at different positions to detect different vibratory movements of the truss structure.

Figure 14:
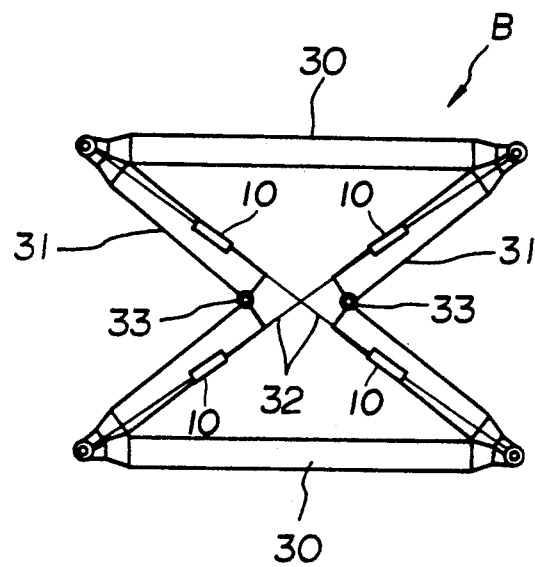
FIG. 14 is a front elevation of an expandable structure according to a fifth embodiment of the invention.
Figure 15:
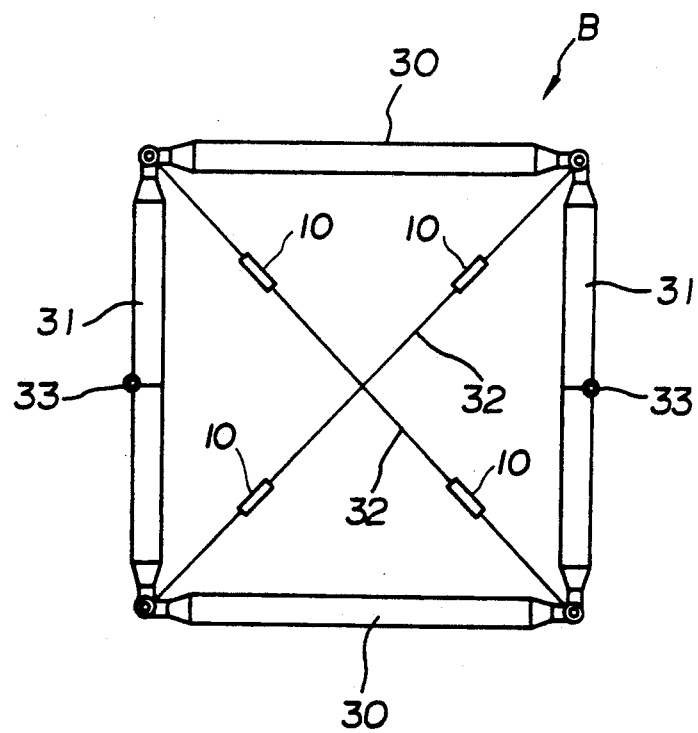
FIG. 15 is a front elevation of the expandable structure in the fully expanded state.

A fifth embodiment of the invention is shown in FIGS. 14 and 15. In the fifth embodiment, the invention is applied to a structure which can be expanded in space outside the earth's atmosphere, and compactly folded for transportion.

An expandable space structure B shown in FIGS. 14 and 15 has support members 30, folding members 31 and diagonal members 32. These members are pivotally connected with one another so that the structure B can be folded as shown in FIG. 14, and expanded as shown in FIG. 15. Each folding member 31 consists of two half rods which are connected with each other by a hinge 33. Each folding member 31 can be folded inwardly by moving the hinged ends of the half rods inwardly toward the center of the structure. The diagonal members 32 prevents the folding members 31 from being folded in the expanded state shown in FIG. 15.

Each of the diagonal members 32 includes two actuators 10 having the structure shown in FIGS. 2, 3 and 4. The actuators 10 of each diagonal member 32 are arranged to increase and decrease the length of the diagonal member 32. A controller is connected with the actuators, and designed to control the power supply to the actuators 10.

While the structure B is being expanded from the folded state to the expanded state shown in FIG. 15, all the piezoelectric elements 26 are held in the deenergized state to allow the relative movement between the outer and inner tubes 12 and 13. Then, the piezoelectric elements 26 are put in the energized state when the structure B has been completely expanded. Therefore, the actuators 10 enable the diagonal members 32 to firmly hold the structure B in the expanded state, and prevent the diagonal members 32 from rattling. The actuators 10 of the type shown in FIGS. 2-4 are advantageous in that the power consumption is low, and the size is very compact.

Figure 16:
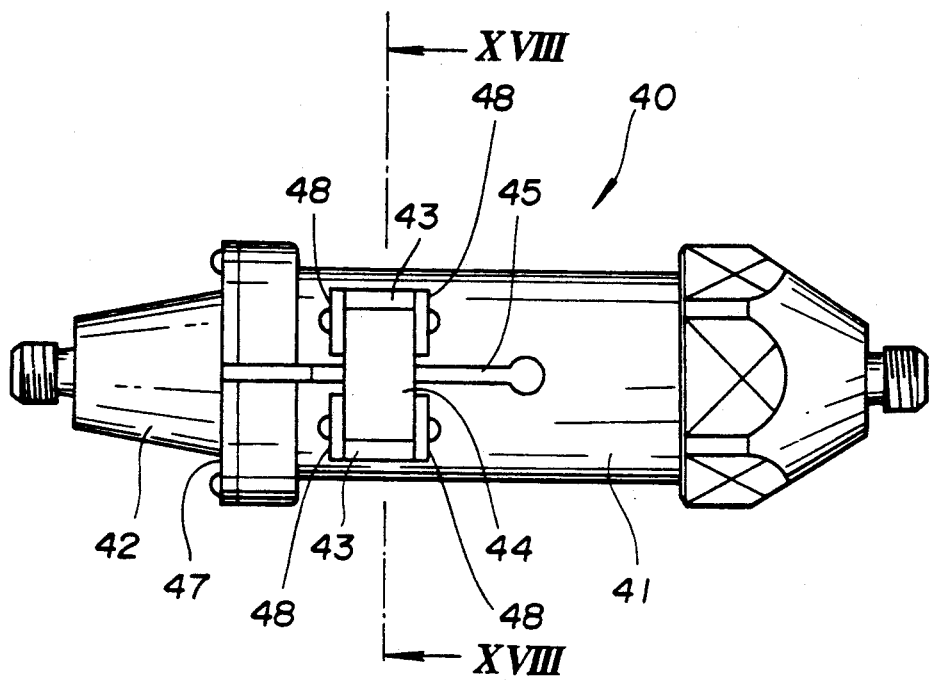
FIG. 16 is a front elevation of an actuator which can be used in any of the preceding embodiments.
Figure 17:
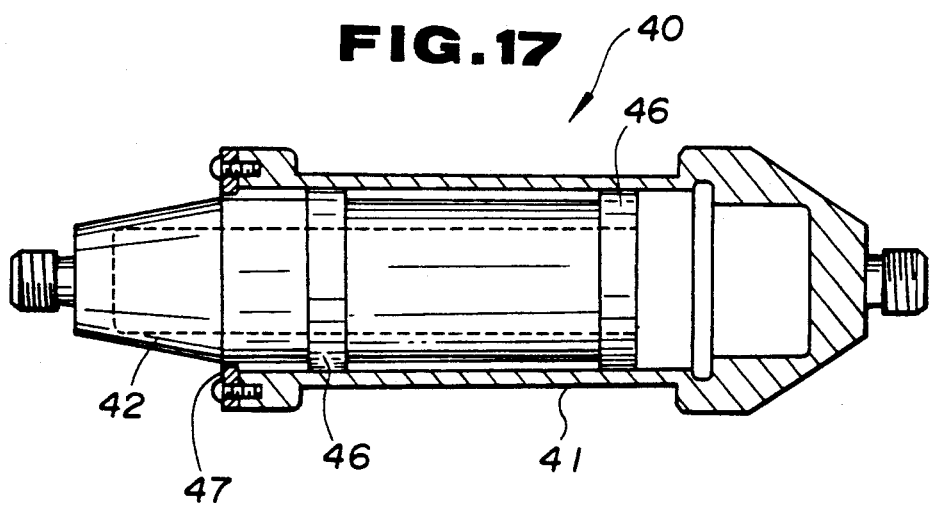
FIG. 17 is a sectional view showing an inner structure of the actuator shown in FIG. 16.
Figure 18:
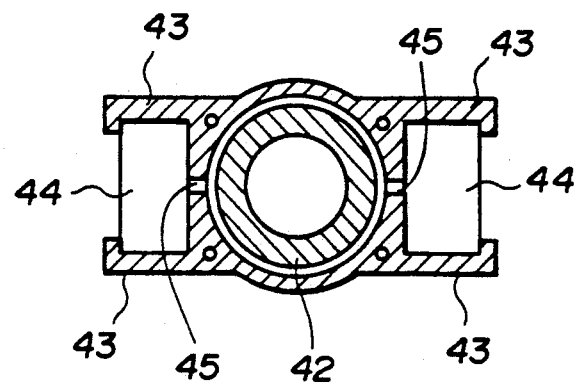
FIG. 18 is a sectional view taken along a line XVIII—XVIII of FIG. 16.

FIGS. 16-18 show a variation of the actuator, which can be used in any of the preceding embodiments in place of the actuator shown in FIGS. 2-4.

An actuator 40 shown in FIGS. 16-18 includes an outer tube 41 and an inner tube 42. The inner tube 42 is fitted in the outer tube 41 so that the inner tube 42 is slidable in the outer tube 41 in the axial direction. The outer tube 41 has two slits 45 extending in the axial direction of the outer tube 41. The slits 45 divide a portion of the outer tube 41 into an upper half segment and a lower half segment. Therefore, the outer tube 41 is two-pronged. Each half segment has left and right holder portions 43 as shown in FIG. 18. The actuator 40 further has first and second piezoelectric elements 44. The first piezoelectric element 44 is held between the left holder portions 43 of the upper and lower half segments of the outer tube 41, and the second one is between the right holder portions 43 of the upper and lower segments. The piezoelectric elements 44 are elongated vertically in FIG. 18, and arranged to increase the inside diameter of the outer tube by pushing the upper half segment upwardly and the lower half segment downwardly in FIG. 18 when the piezoelectric elements 44 are energized.

The inner tube 42 has two annular contact surfaces 46 which are axially spaced. When the piezoelectric elements 44 are in the energized state, the contact surfaces 46 of the inner tube 42 can slide along the inside surface of the outer tube 41 in the axial direction.

A stopper 47 for preventing extraction of the inner tube 42 from the outer tube 41 is fixed to the outer tube 41. Each piezoelectric element 44 is fixed to the holder portions 43 by using screw fasteners and holding plates 48, as shown in FIG. 16.

When the piezoelectric elements 44 are in the deenergized state, the inside surface of the outer tube 41 are pressed radially inwardly, and held in contact with the contact surfaces 46 of the inner tube 42 by the elasticity of the outer tube 41 due to the slits 45. In this state, therefore, the inner tube 42 cannot move axially relative to the outer tube 41, and the actuator 40 has a stiffness in the axial direction.

In the energized state, the piezoelectric elements 44 increase the inside diameter of the outer tube 41 by elongating vertically as viewed in FIG. 18. Therefore, the piezoelectric elements 44 in the energized state allow the inner tube 42 to slide axially in the outer tube 41 by forming a clearance between the inside surface of the outer tube 41, and each contact surface 46 of the inner tube 42. In this state, the actuator 40 has no axial stiffness.

The actuator 40 is held in the high stiffness state by disconnecting the piezoelectric element from the power source. Therefore, the actuator 40 is advantageous in power consumption, as compared with the actuator 10 shown in FIGS. 2-4. Furthermore, the actuator 40 acts in a fail-safe manner by regaining the axial stiffness in case of a power outage due to a failure in an electric power system.

What is claimed is:

1. A vibration control system for a structure, comprising:
    an actuator for varying an axial stiffness in response to a control signal;
    a vibration sensing means for responding to vibration of the structure, and producing a sensor signal; and
    a controller for producing said control signal in accordance with said sensor signal;
    wherein said actuator comprises first and second parts which are axially movable relative to each other, and an active means which varies said axial stiffness of said actuator by preventing and allowing an axial movement between said first and second parts in response to said control signal.

2. A vibration control system according to claim 1 wherein said actuator has a first state in which said axial stiffness of said actuator is set equal to a first value, and a second state in which said axial stiffness is set equal to a second value lower than said first value, and said actuator has a characteristic that enables said actuator to decrease an axial force applied on said actuator in said first state by decreasing said axial stiffness from said first value to said second value, and then increasing said axial stiffness from said second value to said first value.

3. A vibration control system according to claim 1 wherein said first and second parts of said actuator are in the form of telescopic tubes one of which is slidably received in the other, and said active means comprises an active element which varies a difference between diameters of said first and second parts in response to said control signal.

4. A vibration control system according to claim 1 wherein said vibration sensing means comprises a means for determining a displacement of the structure, and a velocity of the structure, and said controller comprises a means for determining a product of said displacement and said velocity, increasing said axial stiffness of said actuator when said product is greater than zero, and decreasing said axial stiffness when said product is smaller than zero.

5. A vibration control system according to claim 4 wherein said actuator, said vibration sensing means and said controller are all mounted on the structure which is a space structure.

6. A vibration control system according to claim 4 wherein said controller comprises a multiplying means for determining said product between said displacement and said velocity, and a means for producing said control signal in a first signal state to increase said axial stiffness when said product is equal to or greater than zero and said control signal in a second signal state to decrease said axial stiffness when said product is smaller than zero.

7. A vibration control system according to claim 6 wherein said vibration sensing means comprises a position sensor for sensing said displacement of a predetermined point of said structure, an acceleration sensor for sensing an acceleration of the predetermined point of the structure, and a means which receives an output signal of said acceleration sensor, and producing a velocity signal representing said velocity.

8. A vibration control system for a structure, comprising:
   an actuator for varying an axial stiffness in response to a control signal;
   a vibration sensing means for responding to vibration of the structure, and producing a sensor signal; and
   a controller for producing said control signal in accordance with said sensor signal;
   wherein said controller comprises a means for decreasing said axial stiffness in such a momentary manner that said axial stiffness is held at a low value only for a short duration when an axial force is applied on said actuator.

9. A vibration control system according to claim 8 wherein said controller comprises a means for normally holding said axial stiffness equal to a high value higher than said low value, and decreasing said axial stiffness in the momentary manner when a magnitude of an axial force applied on said actuator is greater than a predetermined magnitude value.

10. A vibration control system according to claim 8 wherein said controller comprises an impulse generating means for generating an impulse in said control signal to decrease said axial stiffness in the momentary manner, said impulse generating means generating the impulse in every half cycle of the vibration sensed by said vibration sensing means.

11. A vibration control system according to claim 8 wherein said controller comprises a means for generating an oscillating signal indicative of a vibratory motion of the structure in accordance with said sensor signal, and an impulse generating means for generating an impulse in said control signal to decrease said axial stiffness in the momentary manner each time said oscillating signal assumes a predetermined recurring condition.

12. A vibration control system according to claim 8 wherein said controller comprises a means for determining an oscillating variable in accordance with said sensor signal and a first time derivative of said oscillating variable, and for decreasing said axial stiffness of said actuator momentarily each time said oscillating variable becomes greater than a predetermined value and at the same time said first derivative of said oscillating variable becomes smaller than zero.

13. A vibration control system according to claim 8 wherein said actuator is connected in the structure which is a space truss structure, as a structural member of the space truss structure.

14. A vibration control system according to claim 8 wherein said actuator comprises first and second telescopic cylindrical tubes one of which is slidably received in the other, and an active means which varies said axial stiffness of said actuator by preventing and allowing an axial movement between said first and second tubes in response to said control signal, said active means comprising an active element which varies a difference between diameters of said first and second tubes in response to said control signal.

15. A vibration control system according to claim 8 wherein said controller comprises a means for determining a product of an axial force applied on said actuator and a first derivative of said axial force with respect to time, and for decreasing said axial stiffness momentarily each time said product becomes lower than zero.

16. A vibration control system according to claim 15 wherein said controller comprises a means for producing said control signal which alternates between a first signal state to increase said axial stiffness and a second signal state to decrease said axial stiffness and which has a duration of said first signal state which is longer than a predetermined time length and which is longer than a duration of said second signal state.

17. A vibration control system according to claim 8 wherein said vibration sensing means comprises a means for producing said sensor signal representing one of displacement and velocity of the structure, and said controller comprises a means for decreasing said axial stiffness momentarily each time a magnitude of said sensor signal becomes equal to a predetermined value.

18. A vibration control system according to claim 17 wherein said actuator has a first state in which said axial stiffness of said actuator is set equal to a high value higher than said low value of said axial stiffness, and a second state in which said axial stiffness is set equal to said low value which is lower than said high value by a predetermined decrement.

19. A vibration control system according to claim 18 wherein said actuator comprises a means for adjusting said axial stiffness so that said decrement is greater than a half of said high value, and said controller comprises a means for decreasing said axial stiffness momentarily each time said displacement becomes equal to one of a first displacement value which is equal to zero and a second displacement value which is equal to a product obtained by multiplying a maximum displacement by a square root of a quotient resulting from division of a half of said high value by said decrement.

20. A vibration control system according to claim 18 wherein said controller comprises a means for decreasing said axial stiffness momentarily each time either of said velocity and said displacement becomes equal to zero, and said actuator comprises a means for adjusting said high and low values of said axial stiffness so that said decrement is substantially equal to a half of said high value.

21. A vibration control system according to claim 18 wherein said controller comprises a means for decreasing said axial stiffness momentarily each time said velocity becomes equal to zero, and said actuator comprises a means for adjusting said high and low values so that said decrement is smaller than a half of said high value.

22. An actuator for varying a stiffness, comprising:
   first and second parts which are movable in an axial direction of said actuator relative to each other; and
   an active means for varying the stiffness of the actuator by allowing and preventing the relative movement between said first and second parts in response to a control signal.

23. An actuator according to claim 22 wherein said first and second parts are in the form of first and second tubes one of which is telescopically received in the other, and said active means comprises an active element which can cause a radial displacement of a portion of one of said first and second tubes.

24. A system comprising:
   a structure comprising fixed stiffness members and a variable stiffness member comprising an actuator for varying a stiffness of said variable stiffness member, said actuator comprising first and second parts which are movable in an axial direction relative to each other, and an active means for varying the stiffness of said variable stiffness member by allowing and preventing the relative movement between said first and second parts in response to a control signal; and a controller for producing said control signal.

25. A system according to claim 24 wherein said controller comprises a means for controlling a vibration of the structure by producing said control signal.

26. A system according to claim 24 wherein said structure comprises folding members, which are connected with said fixed stiffness members so that said structure can be folded and expanded, and said variable stiffness member is connected with said folding members so that said variable stiffness member can hold said structure expanded.

27. A system according to claim 24 wherein said structure is a space structure which is distant from the earth, and not supported by the earth.

* * * * *